Patented Mar. 29, 1932

1,851,627

UNITED STATES PATENT OFFICE

HENRY J. HARTLEY, OF HASTINGS-ON-HUDSON, NEW YORK, ASSIGNOR, BY MESNE ASSIGNMENTS, TO NICHOLS ENGINEERING AND RESEARCH CORPORATION, OF NEW YORK, N. Y., A CORPORATION OF DELAWARE

PROCESS FOR TREATING EARTHS AND PRODUCTS THEREFROM

No Drawing. Application filed April 16, 1929. Serial No. 355,674.

This invention relates to processes for treating earths such as fuller's earth and the like. It is particularly directed to the revivification of such materials or otherwise changing their physical characteristics such as porosity and density. It is also directed to the products resulting from such processes.

An object of the invention is to provide a simple, economical process for treating such earths to revivify the same or to decrease their density for efficient filtering insulation, and other purposes. Another object of the invention is to provide a process which will economically condition finely pulverized materials, heretofore difficult to revivify or treat. Another object is to provide a material having improved characteristics for filtering, insulation, and for other purposes.

In the oil industries it is the practice to employ as one of the steps in refining, filtration, by which the processed oil is brought in contact with fuller's earth whereby decolorization and purification of the oil results. The fuller's earth after such treatment has continued for some time must have the impurities removed from it or be thrown away. In the petroleum industry it has been the practice to roast the impure earth in furnaces and at limited temperatures to burn out the impurities. It is desirable of course to remove the impurities because they tend to clog the pores of the fuller's earth and thus to cut down the speed of passage of the oil through the earth. The more coarsely ground earths yield to the process of burning and their impurities may be removed in this way. With the more finely ground earths, such as used in the animal and vegetable-oil industry, in the past it was generally necessary to throw away these finely divided spent materials since the ordinary processes of revivification have not been able to satisfactorily re-condition them for use as a filtering media and the like.

One method whereby this finely divided material may be revivified comprises mixing it with a substantial quantity of relatively coarser and granular material, after which it is subjected to heating and after revivification has occurred, the coarser or granular material may be removed from the mixture. According to the present process I am enabled to do away with this addition of coarser material to the spent earth as well as the subsequent necessity of removing this coarser material.

Further and more specific objects, features and advantages will clearly appear from the detailed description given below.

The invention comprises the novel products as well as the novel processes and steps of processes according to which such products are manufactured, the specific embodiments of which are described hereinafter by way of example and in accordance with which I now prefer to practice the invention.

It has been found in accordance with this invention, that earths can be finely precipitated, their porosity increased and their specific volume, that is their bulkiness, made greater by subjecting them to the action of steam within the mass. This steam can be and is preferably formed by mixing sufficient liquid, such as water, with the material to form steam within the mass to produce the desired result when the mass is heated. The amount of water added will vary according to the material treated and the amount of heat necessary will vary according to the material and according to the desired change in the physical characteristics such as porosity and density desired in the resulting product. After treatment to increase the bulkiness of the mass, it may be employed as such for insulating and other purposes, or if the mass is a fuller's earth or similar material which had been used for filtering animal, vegetable or mineral oils, the mass after the above treatment is directly subjected to calcination to remove the carbonaceous and other impurities therefrom.

Below are given examples of the manner which I now prefer for carrying out the invention in the production of improved insulation materials and for the revivification of various spent materials. These examples are given purely as illustrations and are not to be construed in a limiting sense.

*Example 1.*—Filter-press cake containing finely divided spent earth (of about 200 mesh for example) and oil after removal from the filter may be treated with a suitable solvent to recover much of the oil therein, and is then mixed with a suitable quantity of material such as water to form a mass, which under a relatively high temperature generates a gas such as steam at a rate sufficient and in sufficient quantity to make the mass porous and at the same time to decrease its density. The amount of water or the like will vary in accordance with the material treated and the results desired. In treating fuller's earth I preferably mix therewith a sufficient amount of water so as to form a wet mass. This mass is preferably fed by a screw conveyor on to the top of a Herreshoff type multiple hearth furnace where the mass is subjected to a temperature sufficient to form steam in the mass to cause the same to be more or less disintegrated and to have its porosity increased. The density of the mass also decreases, that is, its bulkiness increases, as compared even with the original fuller's earth before subjection to the oil process. The temperature employed may be from 500°–1500° F. The mass as so treated is now ready for revivification. For this purpose the mass is fed successively to the lower hearths of a multiple hearth furnace such for example as described in the patent to Baird 1,375,346 of April 19, 1921. Although the desirable calcining temperature will vary with the nature of the materials under treatment and the impurities therein, the temperature will generally be somewhere between 700 and 1600° F. The treatment of filtering mediums made from volcanic ash, such as that commercially known as "Filtrol", generally requires temperatures approaching the higher limits, whereas ordinary fuller's earth will require temperatures more nearly approaching the lower limit. Under the usual operating conditions in furnaces of ordinary commercial sizes, in starting the process the initial heating by extraneous means such as torches need be continued only for a time, in the neighborhood of, say, one-half hour, and after the process is established and in operation the torches or other sources of heat may be removed and the air regulated to provide the proper temperature which results from the combustion of the carbonaceous and other materials in the fuller's earth. Due to the increased porosity of the material to be revivified and its greater bulk, the air is more readily brought into contact with the particles of the earth and the rate of combustion is, therefore, increased. This increase permits the material to be passed more rapidly through the furnace but at the same time precaution must be taken that the temperatures are not allowed to rise to a point where the properties of the material for filtration or other required purposes are destroyed. As pointed out above the temperatures will generally be at a value between 700 and 1600° F.

With suitable regulation of the temperature and the time of passage of the material through the furnace, the resulting revivified earth is found to have superior filtration properties to the ordinary untreated earth. Its porosity is increased and its density is decreased.

*Example 2.*—For producing a product whose bulk and porosity are increased starting from fresh material, that is not spent material which has been used for filtration purposes, I proceed as follows:—Kieselguhr for example, is mixed with about 55% of water or is treated with a sufficient quantity of other material to produce steam or the like when the mass is subjected to a relatively high temperature, sufficient steam being produced at a rate sufficient to increase the porosity and decrease the density of the mass. The wet mass is fed by a screw conveyor or other means to the top of a Herreshoff multiple hearth furnace as in Example 1. The mass is there subjected to a sufficient temperature whereby steam is produced in the interior and its porosity is increased and density decreased. Thereafter the mass is passed downwardly on to the other hearths which may be preferably maintained at successively lower temperatures. The entire heating of the furnace may be conducted by burning gases supplied from an outside source, or by mixing fuel with the kieselguhr at some time during the treatment thereof, and then igniting this fuel after having initially heated the furnace by torches or otherwise as in Example 1. As will be evident from the examples given, the temperature range and the amount of water or similar liquid present should be such that an evolution of steam or vapor will occur in sufficient quantity and at a sufficient rate to produce the desired porosity.

The product resulting from the above is, as pointed out, of a decreased density and increased porosity. It may be used for filtering, insulation and other purposes. It is believed in connection with the products from both Examples 1 and 2, that the absorptive properties are both increased by the treatments mentioned.

Thus while I have described my improvements in detail and with respect to certain preferred forms, I do not desire to be limited to such details or forms since, as will be noticed by those skilled in the art, after understanding my invention, many changes and modifications may be made and the invention embodied in widely different forms without departing from the spirit and scope thereof in its broader aspects, and I desire to cover all modifications, forms and improvements coming within the scope of any one or more of the appended claims.

Having thus described my invention what I claim as new and desire to secure by Letters Patent is:

1. A process of the kind described which comprises wetting an earth throughout with a volatile liquid adapted to form pores therein on heating, and heating the earth within a temperature range sufficient to cause an evolution of the liquid at a sufficient rate to form pores in said earth, whereby the earth is rendered more porous and less dense than in its original untreated condition.

2. A process of the kind described which comprises wetting an earth throughout with a substantial quantity of water, and heating the wetted earth within a temperature range sufficient to produce steam therefrom at a rate to produce pores in the earth, whereby the earth is rendered more porous and less dense than in its original untreated condition.

3. A process of the kind described which comprises subjecting a mixture of an earth and water containing upwards of 55% of water to a temperature of 500°–1500° F., forming steam in said mixture and removing it therefrom at a rate to form pores in the earth and disintegrating the mixture into a product having a greater porosity and less density than the earth treated.

4. A process of the kind described which comprises subjecting a mixture of fuller's earth and upwards of 55% of water to a temperature of 500–1500° F., forming steam in said mixture and removing it therefrom at a rate to form pores in the earth, disintegrating the mixture into a product having greater porosity and less density than the earth treated.

5. A process of the kind described which comprises subjecting a mixture of a spent earth containing carbonaceous matter, and containing 55% or more of water to a temperature of 500–1500° F., forming steam in said mixture and removing it therefrom at a rate to form pores in the earth, and disintegrating the mixture into a product having a greater porosity and less density than the earth treated and calcining the product, employing the carbonaceous impurities as a fuel for heating the mixture during calcination.

6. A product produced according to the process set forth in claim 1.

In testimony whereof I have signed my name to this specification.

HENRY J. HARTLEY.